S. A. KRONER.
Gate.
No. 61,215.
Patented Jan. 15, 1867.
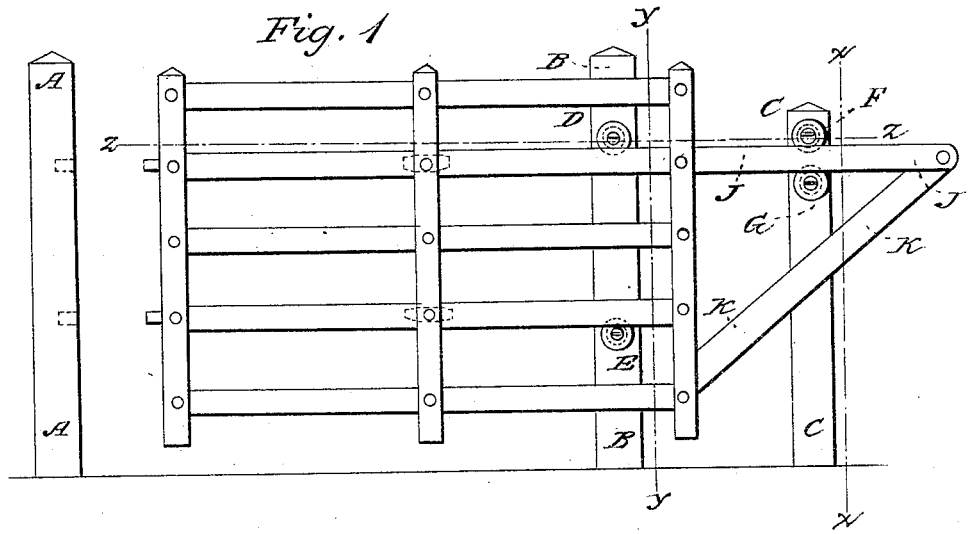
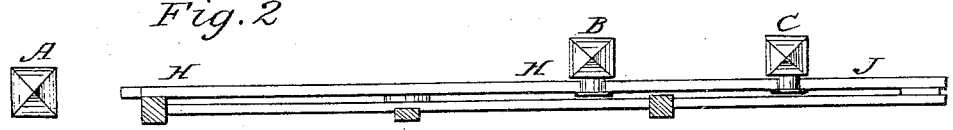
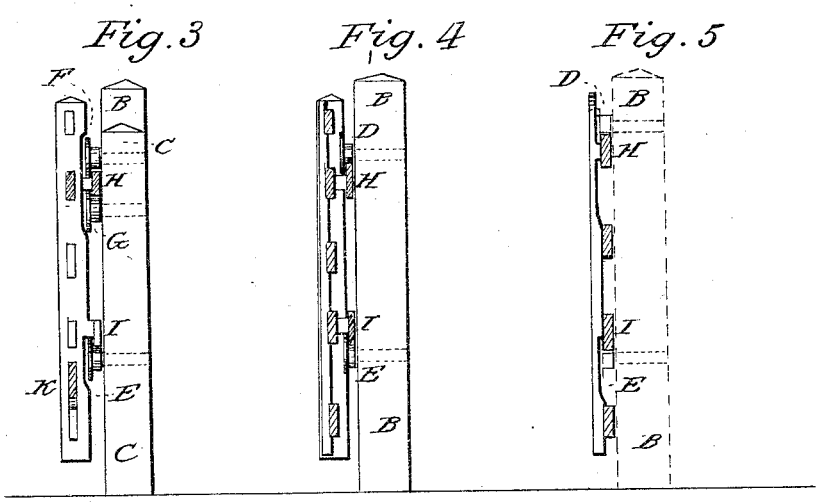
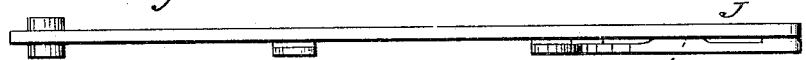
Witnesses:
F. A. Jackson
J. A. Service.
Inventor:
S. A. Kroner.
Per Munn & Co.
attys.

United States Patent Office.

S. A. KRONER, OF DOYLESTOWN, PENNSYLVANIA.

Letters Patent No. 61,215, dated January 15, 1867.

---

IMPROVEMENT IN GATES.

---

The Schedule referred to in these Letters Patent and making part of the same.

---

TO ALL WHOM IT MAY CONCERN:

Be it known that I, S. A. KRONER, of Doylestown, in the county of Bucks, and State of Pennsylvania, have invented a new and useful Improvement in Gates; and I do hereby declare that the following is a full, clear, and exact description thereof, which will enable others skilled in the art to make and use the same, reference being had to the accompanying drawings, forming part of this specification, in which—

Figure 1 is a side view of my improved gate, partly open.

Figure 2 is a horizontal section of the same, taken through the line $x\ x$, fig. 1.

Figure 3 is a vertical section of the same, taken through the line $x\ x$, fig. 1.

Figure 4 is a vertical section of the same, taken through the line $y\ y$, fig. 1.

Figure 5 is relatively the same section as fig. 4, showing my improvement attached to another form of gate, of which Figure 6 is a top view.

Similar letters of reference indicate like parts.

My invention has for its object to furnish an improvement for gates, so constructed and arranged that the gate can be easily opened and closed; that it can be opened in any depth of snow; that it will not blow open or shut; that it will exert no side pressure upon the posts; and that is applicable to gates of any form and size; and it consists in extending the upper track bar to the rear of the gate, and in strengthening it with an inclined brace, and in the combination of horizontal track bars with the gate and friction-rollers; the whole being constructed and arranged as hereinafter more fully described.

A is the front gate post, which is formed with two or more mortises or notches in its inner side, into which the projecting forward ends of two or more of the horizontal bars of the gate enter to sustain the said forward end of the gate against any side pressure. B and C are the rear gate posts, which are set one in the rear of the other, as shown in figs. 1 and 2, and to the sides of which are pivoted the flanged friction-pulleys D E F G, which sustain the gate, and upon which it moves back and forth. The pulleys D and E are attached to the post B in such positions that the upper one, D, shall be above, and the lower one, E, below the upper and lower track bars of the gate. The pulleys F and G are attached to the post C in such positions that one, F, shall be above, and the other, G, below the upper track bar of the gate, as shown in fig. 1. The gate moves back and forth upon the pulleys or rollers E and G, and when shut, and while being shut, its forward end is kept from sagging by the resistance of the rear roller or pulley F; and when open, or while being opened, the rear end is kept from sagging by the resistance of the pulley or roller D. This construction keeps the gate always in a horizontal position when open and shut, and while being opened and shut. To the side of the gate are attached two track bars, H and I. These bars must be of such a thickness as to fit into the spaces between the flanges of the pulleys and the sides of the posts, as shown in figs. 2, 3, 4, and 5, so as to hold the gate steady. In case the gate is formed of horizontal bars the bar-tracks H and I may take the places of two of the horizontal bars of the gate, as shown in figs. 5 and 6; and, in all cases when necessary, the cross-bars of the gate must be notched or cut away, as shown in figs. 3, 4, and 5, to allow the pulleys to pass from one end of the gate to the other. J is an arm, attached to the rear end of the gate so as to form a continuation of the upper track bar to the rear of the gate and keep the gate in connection with the pulleys F G when wholly closed. This arm, J, is supported and strengthened by the inclined brace K, attached to the outer end of the arm J and to the lower part of the gate, as shown in fig. 1.

Having thus described my invention, what I claim as new, and desire to secure by Letters Patent is—

1. The combination of the arm J and brace K with the rear end of the gate, substantially as herein shown and described and for the purpose set forth.

2. The combination of the horizontal track bars H and I with the gate and with the friction-pulleys or rollers D E F G, substantially as herein shown and described and for the purpose set forth.

3. In the arrangement of the pulleys or rollers D E F G in connection with the posts B C, and track rails H I, substantially as herein shown and described, and for the purpose set forth.

S. A. KRONER.

Witnesses:
O. P. SHILLINBERGER,
WM. S. HULSHIZER.